United States Patent [19]

Whiteside et al.

[11] Patent Number: 4,688,913
[45] Date of Patent: Aug. 25, 1987

[54] CAMERA ERECTING SYSTEM

[75] Inventors: George D. Whiteside, Lexington; Richard M. Wingate, Millis, both of Mass.

[73] Assignee: Polaroid Corporation, Cambridge, Mass.

[21] Appl. No.: 945,289

[22] Filed: Dec. 22, 1986

[51] Int. Cl.[4] .................. G03B 15/03; G03B 17/04
[52] U.S. Cl. .................. 354/149.11; 354/187
[58] Field of Search .................. 354/149.11, 187, 189, 354/192, 193

[56] References Cited

U.S. PATENT DOCUMENTS

| | | | |
|---|---|---|---|
| 3,543,661 | 12/1970 | Rosen | 354/187 |
| 3,589,253 | 6/1971 | Erlichman | 354/187 |
| 3,641,894 | 2/1972 | Conner | 354/189 |
| 4,104,662 | 8/1978 | Fukuda | 354/187 |
| 4,389,110 | 6/1983 | Pizzuti | 354/187 |
| 4,452,520 | 6/1984 | Kaplan | 354/126 |
| 4,542,967 | 9/1985 | Costa et al. | 354/187 |

Primary Examiner—A. A. Mathews
Attorney, Agent, or Firm—Alfred E. Corrigan

[57] ABSTRACT

A folding camera having a flash unit, a flash unit housing, a lens housing, and a main housing which receives the flash unit, the flash unit housing, and the lens housing in nested fashion to form a relatively small package when the camera is folded. The erection system for the camera employs an over-center toggle linkage. The over-center toggle links of the erected camera cannot be folded unless the flash unit is first folded into the flash unit housing whereby the over-center toggle linkage is detoggled. Once the over-center toggle links are detoggled, the entire camera can be folded into a relatively small package. The erection system of the camera employs springs which store energy when the camera is folded. A latch mechanism keeps the camera folded, but when the latch is actuated, the springs erect the camera.

19 Claims, 8 Drawing Figures

CAMERA ERECTING SYSTEM

FIELD OF THE INVENTION

The invention relates to a folding camera in which a built-in source of artificial illumination is folded into the camera when the camera is collapsed.

BACKGROUND OF THE INVENTION

In the art of photography, cameras that have a built-in source of artificial illumination that folds into the camera when the camera is collapsed are well known. The purpose of folding the camera is to provide a compact package when the camera is not in use. Generally, such folding cameras have a main housing, a built-in source of artificial illumination in another housing, and some type of erecting system for guiding the camera housings between folded and erected positions and for releasably maintaining the housings in the erected position.

There is one problem associated with such folding cameras that needs to be addressed. When the built-in source of artificial illumination is not properly locked into the folded position and when the remainder of the camera is folded into the main housing, the camera is only partly folded. Under these circumstances, the housing for the built-in source of artificial illumination remains incompletely folded and may even remain partially erect. This situation is undesirable because it subjects the built-in source of artificial illumination to damage or mistreatment when not completely folded into the collapsed camera.

The housing for the built-in source of artificial illumination and the main housing are not sealed off from one another. Therefore, extraneous material such as dirt that may enter into the housing for the built-in source of artificial illumination, because of its partially open condition, can also enter into the main housing. It would be desirable to provide a folding camera in which the housing for the built-in source of artificial illumination is effectively closed and locked when the camera is folded.

Furthermore, it would also be desirable to provide a folding camera in which the camera could not be completely folded unless the housing for the built-in source of artificial illumination were first folded properly before other cameras housings were folded.

It would also be desirable to provide an improved folding camera with a built-in source of artificial illumination that is simple in construction and easy to manufacture and operate.

SUMMARY OF THE INVENTION

Accordingly, it is an object of the present invention to alleviate the disadvantages and deficiencies of the prior art by providing a collapsible camera in which the complete folding in of the built-in source of artificial illumination is assured when the camera is collapsed.

Another object of the invention is to provide a folding camera having a system of folding such that the camera cannot be completely folded unless the built-in source of artificial illumination were first folded properly before the remainder of the camera were folded.

Another object of the invention is to provide an improved folding camera with a built-in source of artificial illumination that is simple in construction and easy to manufacture and operate.

In accordance with the teachings of the present invention, a preferred embodiment is herein disclosed wherein a camera with a built-in source of artificial illumination has a two link erecting system which will not permit folding of the camera until the unit which houses the built-in source of artificial illumination is first folded into the camera.

The camera includes a flash unit including a means for artificial illumination and a housing for the artificial illumination means; a lens housing which is adapted to support a camera lens in position for exposure of the film; and a main housing which is adapted to receive both the flash unit housing and the lens housing when the camera is folded. The flash unit housing is adapted to receive the flash unit, and the lens housing is adapted to receive the flash unit housing when the camera is folded.

The camera includes over-center toggle links for erecting the lens and flash unit housings and for retaining the erected housings in the erected position as long as the over-center toggle links are retained in the over-center toggle position. The over-center toggle is detoggled by the flash unit as it is received in the flash unit housing during initial folding of the camera. Means are provided for detoggling the over-center toggle links. Part of the detoggling means is located on the flash unit, and part of the detoggling means is located on one of the over-center toggle links. The two parts of the detoggling means cooperate with each other to detoggle the over-center toggle links.

Preferably, the flash unit is nested laterally within the flash unit housing, and the flash unit housing is nested laterally within the lens housing. Also, preferably, the lens housing is nested laterally within the main housing.

Preferably, the flash unit is pivotally attached to the flash unit housing, and the flash unit housing is pivotally attached to the main housing. Also, preferably, the lens housing is pivotally attached to the main housing.

Preferably, the flash unit housing is nested radially within the lens housing; and the lens housing is nested radially within the main housing.

In the preferred embodiment of the invention the flash unit includes a closed-end track portion; the first over-center toggle link includes a pin; and the first link pin enters the track portion as the flash unit is received into the flash unit housing. The pin engages the closed-end of the track portion when the flash unit has substantially entered the flash unit housing upon folding. The pin will detoggle the over-center toggle links and permit the camera to be folded. In this way the camera cannot be folded until the flash unit has substantially entered the flash unit housing to detoggle the over-center links.

The camera of the invention also includes an energy source for supplying the energy for erecting the flash unit and lens housing. The energy source is preferably a device for storing energy when the camera is folded and for releasing the stored energy to erect the flash unit and lens housings when the camera unfolds. The preferred energy source is a plurality of springs.

In a further aspect of the invention, in accordance with its objects and purposes, an erecting system for a folding camera includes: a stationary housing; an erectable housing stored in the stationary housing; and over-center toggle links for erecting the erectable housing and for retaining the erected housing in the erected position as long as the over-center toggle links are retained in the over-center toggle position. One of the over-center toggle links is connected to the stationary housing, and the other over-center toggle link is connected to the erectable housing.

An energy source is provided for supplying energy for erecting the erectable housing. The energy source preferably includes an energy storing device for storing energy when the camera is folded and for releasing the stored energy to erect the erectable housing as the camera unfolds. A latch is provided for retaining the energy storing device in the stored energy condition and for releasing the stored energy to erect the erectable housing when the latch is manually operated. The preferred energy storing device is a spring.

Preferably, the over-center toggle links include a first link and a second link connected in over-center toggle fashion. The first link is pivotally connected at its first end to the erectable housing and pivotally connected at its second end to the first end of the second link. The second link is pivotally connected at its second end to the stationary housing. The over-center toggle links prevent folding of the erectable housing until the over-center toggle links are detoggled from the over-center toggle position.

With the camera erection system of the invention, detoggle means are provided for releasing the over-center toggle links from the over-center toggle position. Part of the detoggle means is located on the first link and includes a pin thereon.

Preferably, the erection system includes a stop means located on the second link for retaining the over-center toggle links in the over-center toggle position. More particularly, the stop means on the second link may be a bend or projection portion in the second link that rests up against the first link when the camera is erected.

By employing the principles of the invention, numerous objects are realized and numerous benefits are obtained. For example, a folding camera having a flash unit is provided which will not permit the camera to be folded unless the flash unit is first folded into the camera.

These and other objects and advantages of the present invention will become apparent from a reading of the following specification, taken in conjunction with the enclosed drawings.

DESCRIPTION OF THE PREFERRED EMBODIMENT

Figure 1:
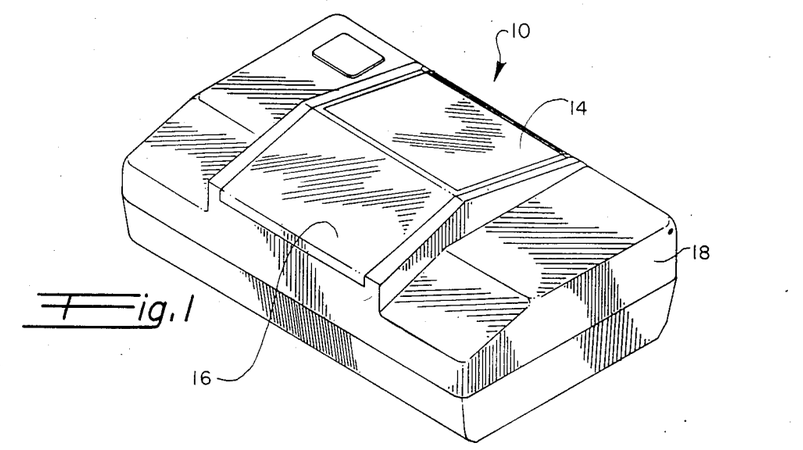
FIG. 1 is a perspective view of a camera in which the flash unit housing and the lens housing have been folded into the main housing.
Figure 2:
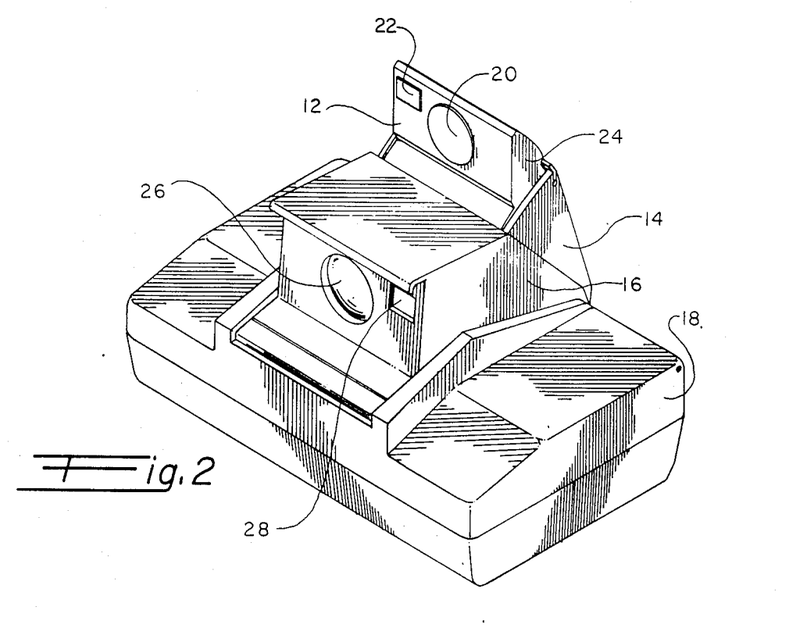
FIG. 2 is a perspective view of a camera having the lens housing and the flash unit housing in the erected position.

With reference to the drawings, and more particularly to FIGS. 1 and 2, there is disclosed a preferred embodiment of the camera of the present invention. In FIG. 1, the camera 10 is shown in the fully closed position. In FIG. 2, the camera 10 is shown in the fully open and erect position. The camera 10 includes a flash unit 12, a flash unit housing 14, a lens housing 16, and a main housing 18.

The flash unit 12 includes a source of illumination or flashbulb 20, a viewfinder 22, and a housing 24 for the flashbulb and viewfinder. The flash unit housing 14 houses the flash unit 12 when the camera is folded. The flash unit housing 14 folds into the rear of the lens housing 16 when the camera is folded.

The lens housing 16 houses a lens 26, a shutter (not shown), and an electric eye 28.

The flash unit 12 is both laterally and radially nested within the flash unit housing 14. The flash unit housing 14 is both laterally and radially nested within the lens housing 16, and the lens housing 16 is both laterally and radially nested within the main housing 18.

Figure 3:
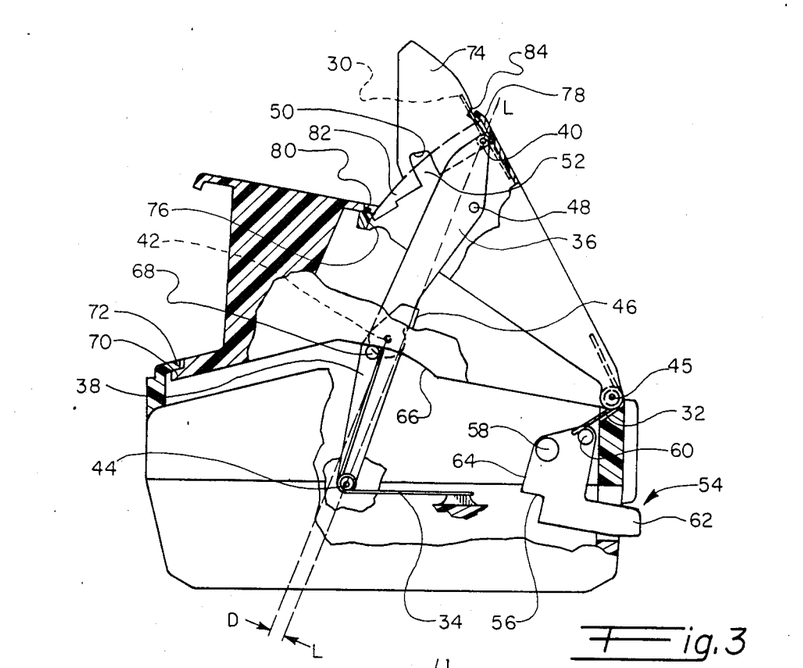
FIG. 3 is a side elevation partially broken away showing the erection mechanism for the camera in the fully unfolded position.
Figure 4:
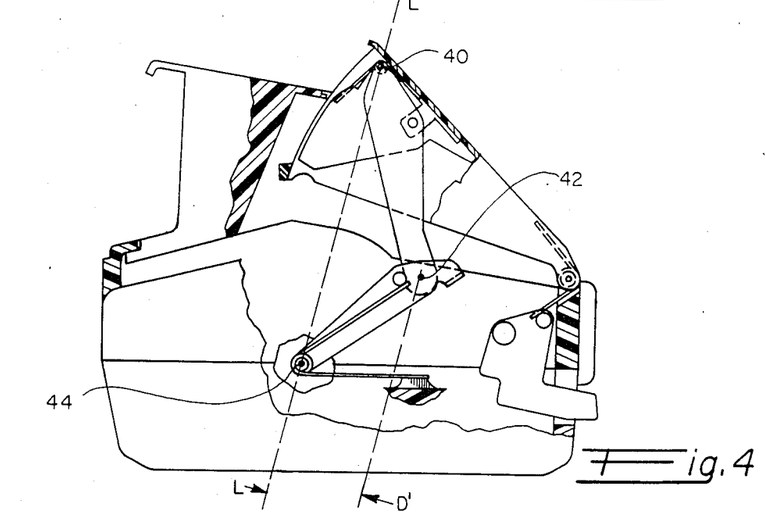
FIG. 4 is a side elevation partially broken away showing the erection mechanism for the camera in an approximately one-third folded position.
Figure 5:
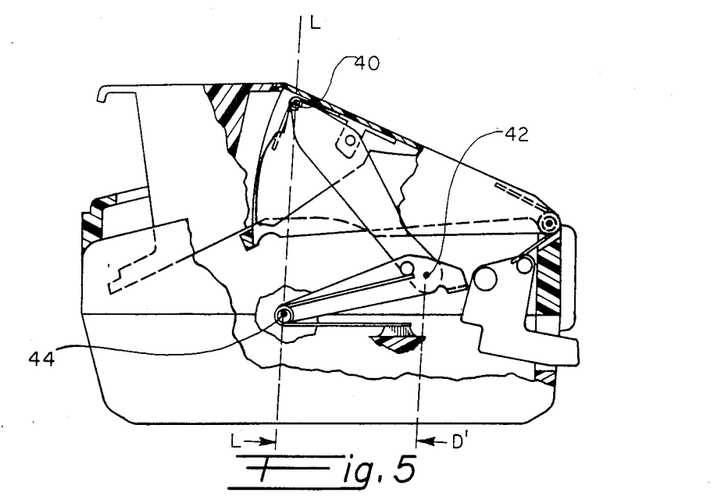
FIG. 5 is a side elevation partially broken away showing the erection mechanism for the camera in an approximately two-thirds folded position.
Figure 6:
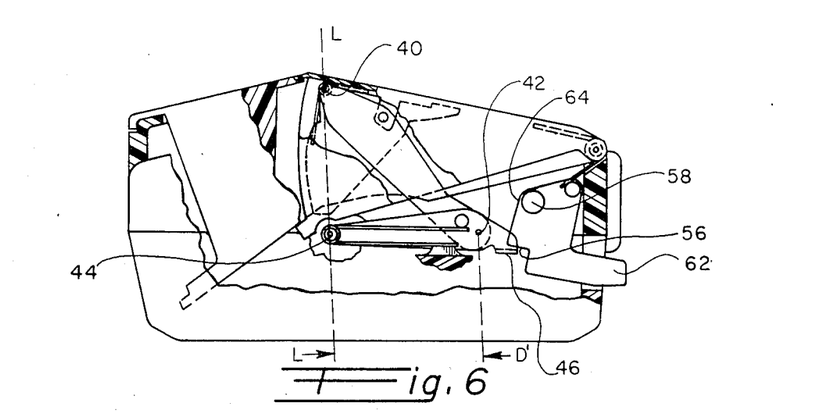
FIG. 6 is a side elevation partially broken away showing the erection mechanism for the camera in a fully folded position.
Figure 7:
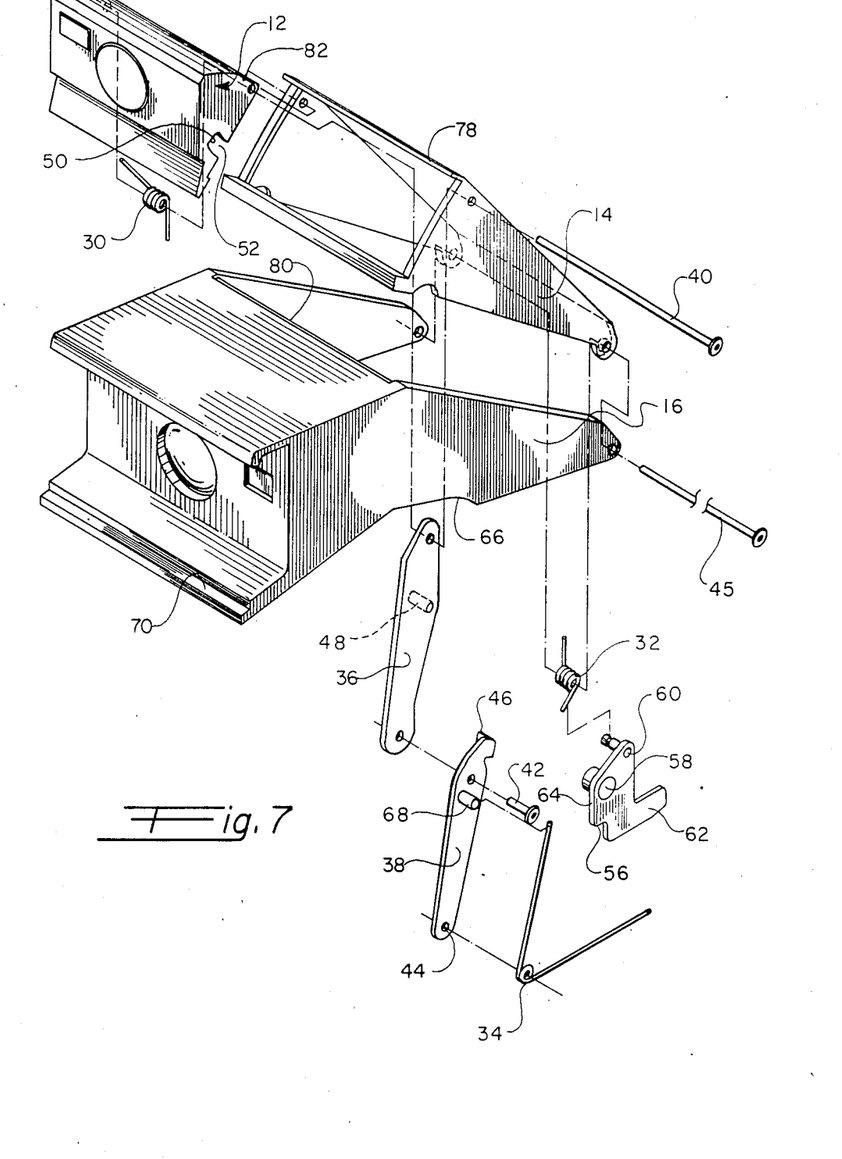
FIG. 7 is an exploded view of the erection mechanism of the camera.
Figure 8:
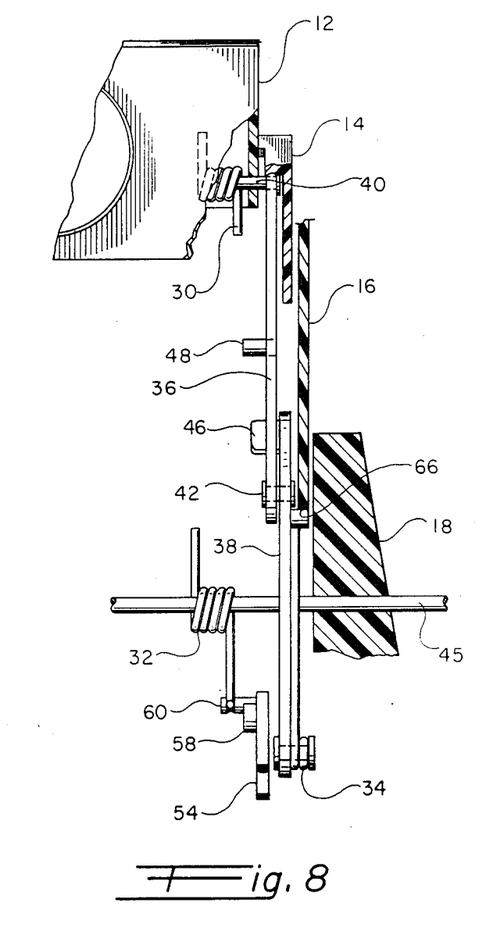
FIG. 8 is a partial front elevation that is enlarged and partially broken away showing the camera erection mechanism.

In FIGS. 3-6, the operation of the erection mechanism is shown in several states: from fully unfolded and erected in FIG. 3 to fully folded in FIG. 6, with intermediate positions shown in FIGS. 4 and 5.

In FIG. 3, the fully erected camera 10 is maintained in the erected state by first spring 30, second spring 32, and third spring 34. First spring 30 maintains flash unit 12 erect with respect to flash unit housing 14. Second spring 32 maintains flash unit housing 14 erect with respect to main housing 18. And third spring 34 maintains over-center toggle links 36 and 38 erect with respect to the main housing 18.

The over-center toggle mechanism includes first link 36, second link 38, first pivot 40, second pivot 42, and third pivot 44. First link 36 is connected to flash unit housing 14 by first pivot 40. First link 36 is connected to second link 38 by second pivot 42. And second link 38 is connected to the main housing 18 by third pivot 44.

The flash unit housing 14 and the lens housing 16 pivotally fold into and out of the main housing 18 by rotation around fourth pivot 45.

In maintaining the camera in the unfolded and erect position, third spring 34 urges second link 38 around third pivot 44 in a counter-clockwise direction. As second link 38 is urged counter-clockwise, first link 36 is urged in a clockwise direction around first pivot 40. However, the motion of first link 36 with respect to second link 38 is stopped by stop projection 46 on second link 38.

When the camera is being folded, the forces urged by the springs 30, 32, and 34 are overcome by the operator who is doing the folding, and the energy for overcoming the urgings of the springs is stored in the springs in the folded position. As shown in FIG. 6, when the camera is completely folded, a latch 54 having a surface 56 engages stop projection 46 and serves to keep the camera in the folded position. Just as the camera reaches the fully folded position, the stop projection 46 briefly pushes the vertical surface 64 of the latch around fifth pivot 58 in a counter-clockwise direction. The stop projection 46 slides upon the vertical surface 64 and rotates the latch 54 around the fifth pivot 58 just long enough for the surface 64 to be traversed, and then the stop projection 46 shifts from the vertical surface 64 to engage the latching surface 56.

Once the latching surface 56 is engaged by the stop projection 46, the camera will remain latched in the folded position until the latch is manually released. In the latched position, the spring 34 urges the stop projection 46 against the latching surface 56. Latch 54 is pivoted on fifth pivot 58 and is urged into the latching position by spring 32 which exerts force upon pin 60. When the latch is to release the folded camera so that the energy stored in the springs can unfold the camera, the latch 54 is manually released by moving the latch handle 62 upwardly so that the latch rotates counter-clockwise around the fifth pivot 58. When the latch 54 is rotated counter-clockwise, the latching surface 56 moves out of engagement with the stop projection 46. Once the latching surface 56 is completely out of engagement with the stop projection 46, the folded camera can spring into an unfolded and erect position.

As shown in FIG. 3, an imaginary line L—L is drawn through the center of first pivot 40 and the center of third pivot 44. In the erect position, second pivot 42 lies to the left of the center line L—L between the two pivot centers by distance D and is thereby "over-center". In operation, when a force is applied on the flash unit housing 14 to close and fold the camera, that force is transmitted axially along the center line between the first pivot 40 and third pivot 44; and the "over-center" second pivot 42 is urged to increase its distance D away from the center line L—L toward the left of the center line.

More specifically, a force for closing and folding the camera that is applied to first link 36 at first pivot 40 will cause first link 36 to tend to rotate counter-clockwise thereby causing stop projection 46 to counteract such a tendency and keep the camera erect and unfolded. Such an intended closing force will not bring about closing of the camera as long as second pivot 42 lies "over-center" to the left of the center line L—L. When the second pivot 42 lies to the left of the center line L—L, the stop projection 46 causes the camera to remain erect and unfolded.

In order to overcome the feature of the over-center toggle links that prevents folding of the camera, it is first necessary to move the position of second pivot 42 from its "over-center" location to the left of the center line L—L to a position to the right of the center line L—L. When the second pivot 42 is located to the right of the center line L—L, and when the camera is under the influence of a force for closing and folding the camera applied axially along the center line L—L, the second pivot 42 moves further toward the right of the center line L—L. As the second pivot 42 moves more to the right of the center line L—L, the links 36 and 38 are permitted to freely rotate around second pivot 42. The first link 36 rotates counter-clockwise with respect to the second pivot 42; and the second link 38 rotates clockwise with respect to the second pivot 42. As the first and second links 36 and 38 rotate with respect to the second pivot 42 and with respect to one another, the distance between first pivot 40 and third pivot 44 diminishes. When the distance between the first pivot 40 and the third pivot 44 diminishes, the camera is collapsing and being folded.

In order to shift the second pivot 42 from the over-center position to the left of the center line L—L to the over-center position to the right of line L—L, a detoggle pin 48 is provided on first link 36. When a force is exerted on detoggle pin 48 in a direction away from the line L—L as shown in FIG. 3, the first link 36 rotates in a counter-clockwise direction around first pivot 40. Furthermore, as first link 36 rotates in a counter-clockwise fashion around first pivot 40, the second pivot 42 is also rotated around the first pivot 40 in a counter-clockwise manner. As the second pivot 42 moves in a counter-clockwise manner around the first pivot 40, the left hand over-center distance D between the second pivot 42 shown in FIG. 3 and the center line L—L diminishes. With continued movement of the second pivot 42 around first pivot 40, the center line L—L is reached and then passed through so that a new over-center distance D' is formed on the right side of the line L—L as shown in FIG. 4.

By passing second pivot 42 from a position to the left of the center line L—L, over the center line L—L, and to a position to the right of the center line L—L, the over-center toggle links are detoggled, and the camera can be folded into a more compact package.

The preferred way of detoggling the over-center toggle links is to provide a detoggle pin 48 which is pushed by the closed end 50 of track 52 on the flash unit 12. When the erected camera is begun to be folded, flash unit 12 is moved in a counter-clockwise direction around first pivot 40. Then, when the flash unit 12 is substantially received in the flash unit housing 14 as shown in FIG. 4, the closed end 50 of the flash unit track pushes detoggle pin 48 in a counter-clockwise direction around first pivot 40 thereby causing the left-of-center over-center second pivot 42 shown in FIG. 3 to detoggle and move to the right-of-center detoggled over-center position shown in FIG. 4.

Once the over-center toggle links are detoggled, the flash unit housing 14 can be folded into the lens housing 16. As the flash unit housing 14 gradually moves into the lens housing 16, the curved back surface 74 of the flash unit 12 is guided by a complementary curved guide surface 76 located in the lens housing. When the flash unit housing 14 is completely folded into the lens housing 16, a stop lip 78 on the flash unit housing is received by a stop recess 80 on the lens housing.

When the flash unit 12 is in the erected position, a foot portion 82 is engaged with the guide surface 76. Also, when the flash unit 12 is in the erected position, a rear recess 84 on the flash unit is engaged by the stop lip 78 on the flash unit housing. Simultaneous engagement of the foot portion 82 with the guide surface 76 and the rear recess 84 with the stop lip 78 serves to support the flash unit 12 when it is in the erect position.

In accordance with another aspect of the preferred embodiment, the bottom of the lens housing 16 has a camming surface 66 which is in sliding engagement with cam 68 located on second link 38. The cam 68, through the urging of spring 34, serves to support the lens housing 16 when the camera is in the erected position. In the erected position, a stopping lip 70 of the lens housing 16 engages a stopping flange 72 on the main housing 18 thereby preventing the lens housing 16 from rising too far in the erected position.

As the camera is folded, the position of the second link 38 is lowered thereby lowering the height of the cam 68. As the height of the cam 68 is lowered, the support for the lens housing 16 is lowered, and the lens housing folds into the main housing 18.

Obviously, many modifications may be made without departing from the basic spirit of the present invention. For example, a stop projection can be located on the first link of the over-center toggle links as well as on the second link.

Detoggling of the over-center toggle links can be accomplished in additional ways. For example, the over-center toggle links can be mutually detoggled by an operator using a finger and pushing the over-center pivot from the toggled to the detoggled position.

Accordingly, it will be appreciated by those skilled in the art that within the scope of the appended claims, the invention may be practiced other than has been specifically described herein.

What is claimed is:

1. A folding camera having a lens and film therein, said camera comprising:
   flash unit means including artificial illumination means and a housing for said artificial illumination means;
   a flash unit housing being adapted to receive said flash unit means as the camera is folded;
   a lens housing being adapted to support a camera lens in position for exposure of the film, said lens housing being adapted to receive said flash unit housing as the camera is folded;
   a main housing being adapted to receive said flash unit housing and said lens housing as the camera is folded;
   over-center toggle means including first and second links for erecting said lens and flash unit housings and for retaining said erected housings in the erected position as long as said over-center toggle means is retained in the over-center toggle position, said over-center toggle means being adapted to be detoggled by said flash unit means as it is received in said flash unit housing; and
   detoggle means located on said flash unit means which cooperates with complementary detoggle means located on said over-center toggle means for moving said over-center toggle means to a position in which said flash unit housing may be folded into said lens housing.

2. The camera described in claim 1, wherein:
   said flash unit means is nested laterally within said flash unit housing;
   said flash unit housing is nested laterally within said lens housing; and
   said lens housing is nested laterally within said main housing.

3. The camera described in claim 1, wherein:
   said flash unit means is pivotally attached to said flash unit housing;
   said flash unit housing is pivotally attached to said main housing; and
   said lens housing is pivotally attached to said main housing.

4. The camera described in claim 1, wherein:
   said flash unit housing is nested radially within said lens housing; and
   said lens housing is nested radially within said main housing.

5. The camera described in claim 1, wherein:
   said flash unit means includes a closed-end track portion;
   said first link includes a pin means, and said first link pin means enters said track portion as said flash unit is received into said flash unit housing and said pin means engages the closed-end of said track portion when said flash unit means has substantially entered said flash unit housing.

6. The camera described in claim 5, wherein said flash unit means is not totally received by said flash unit housing before said first link pin means is engaged by the closed-end of said flash unit track.

7. The camera described in claim 1, wherein:
   said flash unit housing includes a curved back surface; and
   said lens housing includes a complementary curved guide surface which guides said flash unit housing as it is received in said lens housing.

8. The camera described in claim 1, wherein:
   said flash unit housing includes a stop lip; and
   said lens housing includes a complementary stop recess for receiving said stop lip when said flash unit housing is completely received within said lens housing.

9. The camera described in claim 1, wherein:
   said flash unit housing includes a stop lip; and
   said flash unit includes a rear recess that is engaged by said stop lip when said flash unit is in the erected position.

10. The camera described in claim 1, wherein:
    the bottom of said lens housing includes a camming surface; and
    said over-center toggle means includes a cam in sliding engagement with said camming surface, said cam serving to support said lens housing when the camera is in the erect position.

11. The camera described in claim 1, wherein:
    said lens housing includes a stopping lip; and
    said main housing includes a stopping flange engaging said stopping lip for preventing said lens housing from rising more than a predetermined height in the erected position.

12. The camera described in claim 1, wherein said detoggle means located on said flash unit means is a closed track.

13. The camera described in claim 1, wherein said detoggle means located on said over-center toggle means is a pin.

14. The camera described in claim 1, wherein said first link is pivotally connected at a first end to said flash unit housing and pivotally connected at a second end to a first end of said second link, said second link being pivotally connected at a second end to said main housing, said over-center toggle means preventing folding of said flash unit housing until said over-center toggle means is detoggled from the over-center toggle position.

15. The camera described in claim 1, wherein said detoggle means is located on said first link means.

16. A folding camera having a lens and film therein, said camera comprising:
    flash unit means including artificial illumination means and a housing for said artificial illumination means;
    a flash unit housing being adapted to receive said flash unit means as the camera is folded;
    a lens housing being adapted to support a camera lens in position for exposure of the film, said lens housing being adapted to receive said flash unit housing as the camera is folded;

a main housing being adapted to receive said lens housing as the camera is folded and being adapted to support said lens housing when the camera is erected, said main housing having an opening for receipt of said lens housing, wherein said main housing opening is narrower than the length of the main housing, said lens housing having an opening for receipt of said flash unit housing wherein said lens housing opening is narrower than the length of said lens housing; and over-center toggle means for erecting said lens and flash unit housings and for retaining said erected housings in the erected position as long as said over-center toggle means is retained in an over-center toggle position, said over-center toggle means being detoggled by said flash unit means as it is received in said flash unit housing.

17. A folding camera having a lens and film therein, said camera comprising:

flash unit means including artificial illumination means and a housing for said artificial illumination means;

a flash unit housing being adapted to receive said flash unit means as the camera is folded, said flash unit means being nestable laterally and radially within said flash unit housing, said flash unit means being pivotally attached to said flash unit housing;

a lens housing being adapted to support a camera lens in position for exposure of the film, said lens housing being adapted to receive said flash unit housing as the camera is folded, said flash unit housing being nestable laterally and radially within said lens housing;

a main housing being adapted to receive said nested flash unit housing and said lens housing as the camera is folded, said lens housing being nestable laterally and radially within said main housing, said flash unit housing and said lens housing being pivotally attached to said main housing;

over-center toggle means for erecting said lens and flash unit housings and for retaining said erected housings in the erected position as long as said over-center toggle means is retained in an over-center toggle position, said over-center toggle means being detoggled by said flash unit means as it is received in said flash unit housing, said over-center toggle means including first link means and second link means connected in over-center toggle fashion, said first link means being pivotally connected at a first end to said flash unit housing and pivotally connected at a second end to a first end of said second link means, said second link means being pivotally connected at a second end to said main housing, said over-center toggle means preventing folding of said flash unit housing until said over-center toggle means is detoggled from the over-center toggle position; and detoggle means including a closed end track located on said flash unit means which cooperates with complementary means located on said first link means for moving said first and second link means out of an over-center position.

18. A folding camera having a lens and film therein, said camera comprising:

flash unit means including artificial illumination means and a housing for said artificial illumination means;

a flash unit housing being adapted to receive said flash unit means as the camera is folded;

a lens housing being adapted to support a camera lens in position for exposure of the film, said lens housing being adapted to receive said flash unit housing as the camera is folded;

a main housing being adapted to receive said nested flash unit housing and said lens housing as the camera is folded;

over-center toggle means for erecting said lens and flash unit housings and for retaining said erected housings in the erected position as long as said over-center toggle means is retained in an over-center toggle position, said over-center toggle means being detoggled by said flash unit means as it is received in said flash unit housing, said over-center toggle means including first link means and second link means connected in over-center toggle fashion, said first link means being pivotally connected at a first end to said flash unit housing and pivotally connected at a second end to a first end of said second link means, said second link means being pivotally connected at a second end to said main housing, said over-center toggle means preventing folding of said flash unit housing until said over-center toggle means is detoggled from the over-center toggle position, and detoggle means including closed end track means located on said flash unit means which cooperates with complementary pin means located on said first link means;

energy means for supplying the energy for erecting said flash unit and lens housings; and latch means for retaining said energy storing means in a stored energy condition and for releasing the stored energy to erect said flash unit and lens housings when said latch means is manually operated.

19. A folding camera having a lens and film therein, said camera comprising:

flash unit means including artificial illumination means and a housing for said artificial illumination means;

a flash unit housing being adapted to receive said flash unit means as the camera is folded, said flash unit means being nestable laterally and radially within said flash unit housing, said flash unit means being pivotally attached to said flash unit housing;

a lens housing being adapted to support a camera lens in position for exposure of the film, said lens housing being adapted to receive said flash unit housing as the camera is folded, said flash unit housing being nestable laterally and radially within said lens housing;

a main housing being adapted to receive said nested flash unit housing and said lens housing as the camera is folded, said lens housing being nestable laterally and radially within said main housing, said flash unit housing and said lens housing being pivotally attached to said main housing;

over-center toggle means for erecting said lens and flash unit housings and for retaining said erected housings in the erected position as long as said over-center toggle means is retained in an over-center toggle position, said over-center toggle means being detoggled by said flash unit means as it is received in said flash unit housing, said over-center toggle means including first link means and second link means connected in over-center toggle fashion, said first link means being pivotally connected at a first end to said flash unit housing and pivotally connected at a second end to a first end of said second link means, said second link means being pivotally connected at its second end to said main housing, said second link means including stop means for retaining said over-center toggle means in the over-center toggle position, said over-center toggle means preventing folding of said flash unit housing until said over-center toggle means is detoggled from the over-center toggle position;

detoggle means including closed end track means located on said flash unit means which cooperates with complementary pin means located on said first link means;

energy means for supplying the energy for erecting said flash unit and lens housings; and latch means for retaining said energy storing means in a stored energy condition and for releasing the stored energy to erect said flash unit and lens housings when said latch means is manually operated.

* * * * *